United States Patent [19]
Houpt

[11] Patent Number: 5,514,199
[45] Date of Patent: May 7, 1996

[54] SPINNER FOR PRODUCING DUAL COMPONENT FIBERS

[75] Inventor: Ronald A. Houpt, Newark, Ohio

[73] Assignee: Owens-Corning Fiberglas Technology, Inc., Summit, Ill.

[21] Appl. No.: 309,235

[22] Filed: Sep. 20, 1994

[51] Int. Cl.[6] .......................... C03B 37/08; C03B 37/023
[52] U.S. Cl. .................... 65/502; 65/504; 65/521; 269/DIG. 26; 269/211.1; 269/168
[58] Field of Search .............................. 65/502, 504, 516, 65/521, 438, 459, 470; 264/211.1, DIG. 26, DIG. 29, 168, 174

[56] References Cited

U.S. PATENT DOCUMENTS

| | | |
|---|---|---|
| 2,313,630 | 3/1943 | Dockerty . |
| 2,722,718 | 11/1955 | Siu . |
| 2,927,621 | 3/1960 | Slayter et al. . |
| 2,998,620 | 9/1961 | Stalego . |
| 3,073,005 | 1/1963 | Tiede . |
| 3,075,241 | 1/1963 | Dietzsch .................... 264/DIG. 26 |
| 3,653,861 | 4/1972 | Stalego et al. . |
| 3,881,903 | 5/1975 | Stalego . |
| 4,145,199 | 3/1979 | Russell . |
| 4,203,745 | 5/1980 | Battigelli . |

FOREIGN PATENT DOCUMENTS

| | | |
|---|---|---|
| 2141853 | 8/1971 | Germany . |
| 47-18903 | 5/1972 | Japan . |

*Primary Examiner*—David A. Simmons
*Assistant Examiner*—John Hoffmann
*Attorney, Agent, or Firm*—C. Michael Gegenheimer; Robert L. Showalter

[57] ABSTRACT

An apparatus for making dual component fibers is provided and includes a distributor having orifices in the peripheral wall and nested within a rotary spinner. The distributor is divided into a series of generally vertically-aligned compartments by baffles positioned circumferentially around the interior of the peripheral wall, with the orifices communicating with the compartments. First and second molten thermoplastic materials are supplied to the distributor and centrifuged as alternating thin layers to the face of the spinner. The spinner is also rotated to centrifuge dual component fibers through the orifices in the peripheral wall of the spinner.

14 Claims, 5 Drawing Sheets

SPINNER FOR PRODUCING DUAL COMPONENT FIBERS

BACKGROUND OF THE INVENTION

This invention relates to an apparatus for manufacturing dual component fibers from thermoplastic materials, and more particularly to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

The temperatures of molten glasses used in rotary fiberizing processes may exceed 2000° F. (1093° C.). Because of the high temperatures involved and the high rotational speeds of the spinners, the materials of construction for such devices present many demands on those materials to withstand those conditions. Corrosion resistance is also required so that the orifices in the spinner maintain their designed size and shape.

A modification of conventional glass fibers, which are usually straight fibers, is the use of fibers which are curly (helical) in shape. These fibers can be made by joining two distinct glass streams, commonly referred to as the A glass and B glass streams, and centrifuging the dual glass stream into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a dual glass stream.

However, there remains a need in this art for improving the delivery of dual streams of molten glasses to form dual glass or other thermoplastic fibers.

SUMMARY OF THE INVENTION

This need is met by the present invention in which a series of orifices are positioned in the peripheral wall of a distributor, which orifices are fed with different molten thermoplastic materials from adjacent compartments in the distributor nested within a rotary spinner. The thermoplastic materials are centrifuged therefrom as thin, alternating layers which impinge upon the inner face of a peripheral wall of the spinner. Orifices in the peripheral wall of the spinner are positioned so that a portion of each of the different thermoplastic material layers are centrifuged therethrough to form dual component fibers. For purposes of this patent specification, in using the terms "glass fibers" and "glass compositions", "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers. Combinations of glasses and polymers are also contemplated.

In accordance with one aspect of the present invention, an apparatus for making dual component fibers is provided and includes a distributor having peripheral and bottom walls, and further including orifices in the peripheral wall. The distributor is divided into a series of generally vertically-aligned compartments by baffles positioned circumferentially around the interior of the peripheral wall, with the orifices communicating with the compartments.

The first and second molten thermoplastic materials are supplied to the distributor by any suitable equipment. For example, if the materials are glasses, the equipment will include melting furnaces and foreheaths to supply the two molten glasses. A divider is provided in the distributor for directing the first molten thermoplastic material into alternate ones of the compartments and for directing the second molten thermoplastic material into the remaining ones of the compartments so that adjacent compartments contain different thermoplastic materials.

The distributor is nested within a rotary spinner having peripheral and bottom walls. The spinner further includes orifices in the peripheral wall. Means, such as, for example, a rotary drive mechanism, are also provided for rotating the distributor to centrifuge alternating layers of the first and second thermoplastic materials through the orifices in the peripheral wall of the distributor and against the inner face of the peripheral wall of the spinner.

Separate means, again such as, for example, a rotary drive mechanism, are provided for rotating the spinner to centrifuge dual component fibers through the orifices in the peripheral wall of the spinner. This is accomplished by positioning the orifices in the spinner peripheral wall so that when the alternating layers of first and second molten thermoplastic materials impinge on an inner face of the spinner peripheral wall, the interface between the alternating layers is generally centered over the orifices. Thus, viewing each individual orifice in the spinner peripheral wall axially through the orifice, one of the molten thermoplastic materials occupies the upper half of the orifice, while the other molten thermoplastic material occupies the lower half.

Separate rotary drives are provided to insure proper distribution of the thin alternating layers of the thermoplastic materials from the distributor and then proper centrifuging of the dual component fibers from the spinner. The drives are preferably operated at different rotational speeds or directions.

The divider in the distributor includes a generally horizontal flange positioned intermediate the distributor peripheral wall. Generally vertical wall portions above and below the flange direct the first and second molten thermoplastic materials into alternate ones of the compartments. The orifices in the peripheral wall of the distributor are preferably generally vertically aligned, with at least one vertical row of orifices communicating with each compartment. To provide the alternating thin layers of thermoplastic materials to the spinner, the rows of orifices communicating with compartments in the distributor containing the first thermoplastic material are vertically offset from the rows of orifices communicating with the second thermoplastic material. As the distributor is rotated, thin alternating layers of the different molten thermoplastic materials are created by the radial spreading movement of the molten materials. The relative viscosities of the thermoplastic materials and the short period of time in which they are in contact in a molten state prevent any substantial intermixing of the materials and result in well-defined interfaces between layers.

In a preferred embodiment of the invention, the thermoplastic materials are glasses, and the distributor is adapted to receive two separate molten glass streams for fiberization into dual fibers. Preferably, the glasses have different viscosities so that, upon fiberization and cooling, they form irregularly shaped fibers.

Accordingly, it is an feature of the present invention to provide an apparatus which includes a distributor nested within a rotary spinner which forms dual component fibers. This, and other features and advantages of the present invention will become apparent from the following detailed description, the accompanying drawings, and the appended claims.

DETAILED DESCRIPTION OF THE PREFERRED EMBODIMENTS

The invention will be described in terms of apparatus for making irregularly-shaped (i.e., non-straight along their axial length) dual glass fibers, although it is to be understood that the invention encompasses apparatus for making not only other types of dual glass fibers such as curly (helical) fibers, but also dual component fibers of other thermoplastic materials such as polyester or polypropylene, or combinations of glass and polymer.

Figure 1:
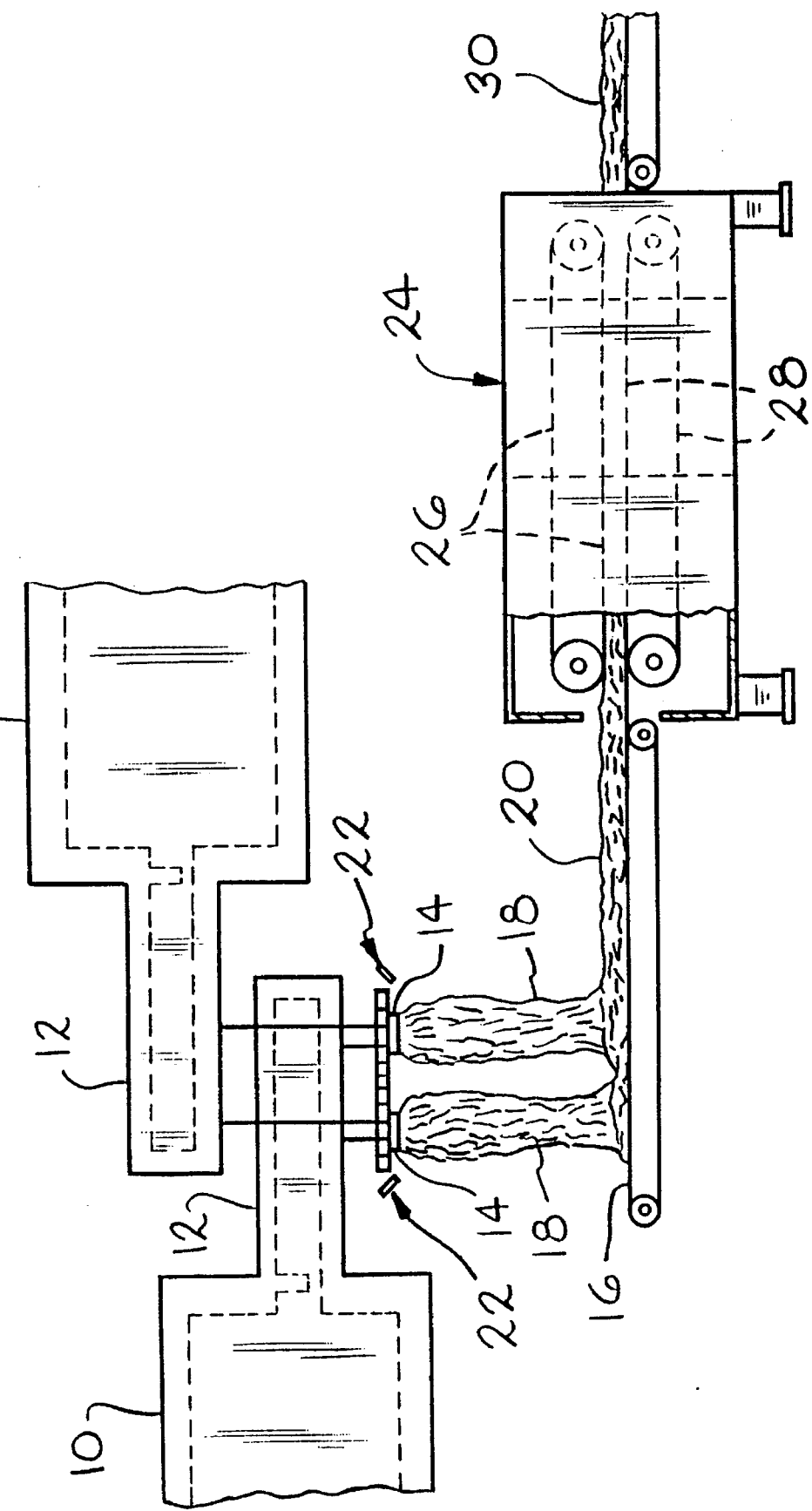
FIG. 1 is a schematic view, in elevation, of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. For this invention, the rotary fiberizers include a rotary spinner with a rotary distributor nested therein. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of dual glass fibers, such as irregularly-shaped glass fibers produced by the fiberizers, are collected on conveyor 16 as wool pack 20 by means of a vacuum positioned beneath the conveyor (not shown). As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700° to 1200° F. (371° to 650° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 15 minutes, the wool pack then exits oven 24 as insulation product 30.

It is to be understood that heat setting is an optional aspect of the present invention. Alternatively, the wool pack may be encapsulated with an exterior plastic layer as taught by Schelhorn et al, U.S. Pat. No. 5,277,955, the disclosure of which is hereby incorporated by reference. Further, the wool pack may be subjected to other fabrication techniques including stitching, needling, or hydro-entanglement.

Figure 2:
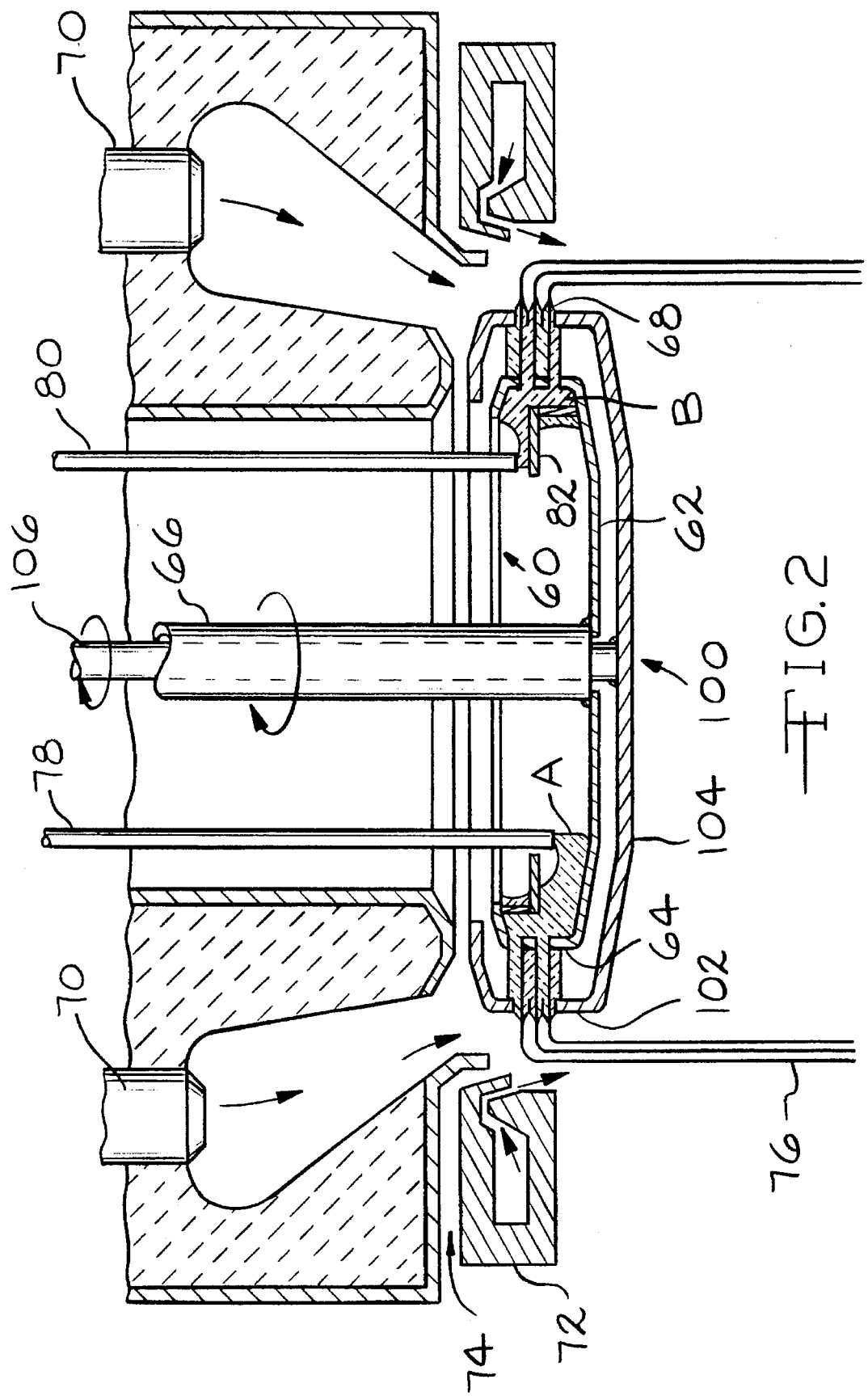
FIG. 2 is a cross-sectional view, in elevation, of the fiberizer/spinner, with distributor nested therein, used in the practice of the invention.

As shown in FIG. 2, distributor 60 includes a distributor peripheral wall 64 and a bottom wall 62. Distributor 60 is rotated on a spindle 66 by a suitable drive mechanism (not shown). The interior of distributor 60 is supplied with two separate streams of molten glass, first stream 78 containing glass A and second stream 80 containing glass B. The glass in stream 78 drops directly onto distributor bottom wall 62 and flows outwardly due to centrifugal force toward distributor peripheral wall 64 to form a head of glass A as shown. Glass B in molten glass stream 80 is positioned closer to distributor peripheral wall 64 than stream 78, and the B glass in stream 80 is intercepted by horizontal flange 82 before it can reach the distributor bottom wall 62. Thus, a build-up or head of glass B is formed above horizontal flange 82 as shown.

While flange 82 is shown as being located at approximately the mid-point of peripheral wall 64, it will be appreciated that flange 82 my be located at various heights relative to distributor bottom wall 62. This positioning may permit manipulation of the temperature profile of the face of peripheral wall 64, particularly where the temperatures of the A and B glasses differ.

Figure 3:
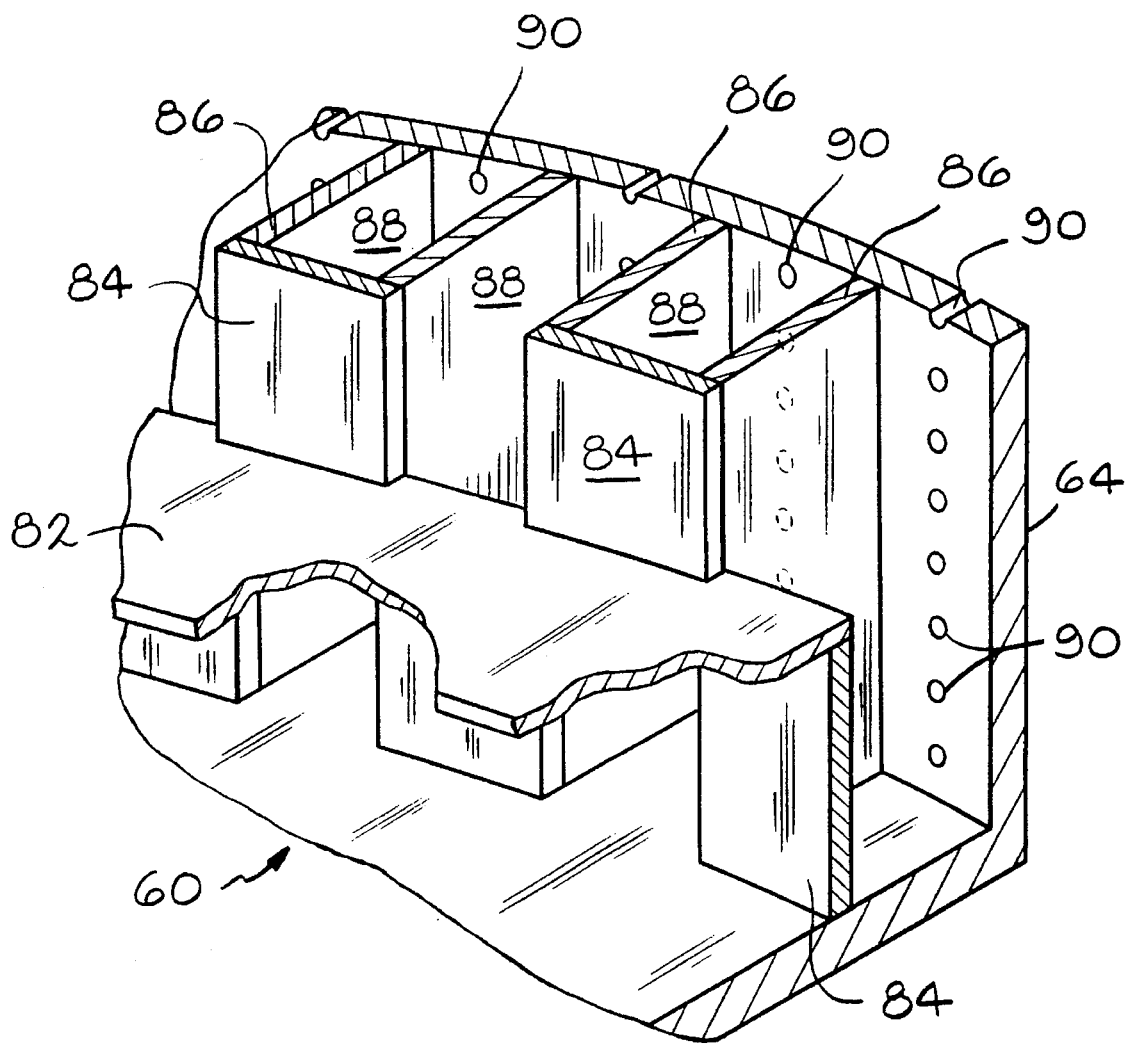
FIG. 3 is a perspective view taken from the interior of the distributor showing the divider and compartments for the A and B glass components.

As best shown in FIG. 3, distributor 60 is adapted with a series of vertical interior wall segments 84 which are generally circumferential and positioned radially inwardly from the distributor peripheral wall 64. A series of vertical baffles 86, positioned between distributor peripheral wall 64 and vertical interior wall segments 84, divide that space into a series of generally vertically-aligned compartments 88 which run substantially the entire height of distributor peripheral wall 64.

Alternate compartments contain glass A and glass B which flow, respectively, into compartments 88 through the openings between wall segments 84. As shown, the wall segments 84 skip every other compartment. It can be seen that horizontal flange 82, vertical interior wall segments 84, and baffles 86 together comprise a divider for directing glasses A and B into alternating adjacent compartments 88 so that every other compartment contains glass A while the remaining compartments contain glass B.

Figure 4:
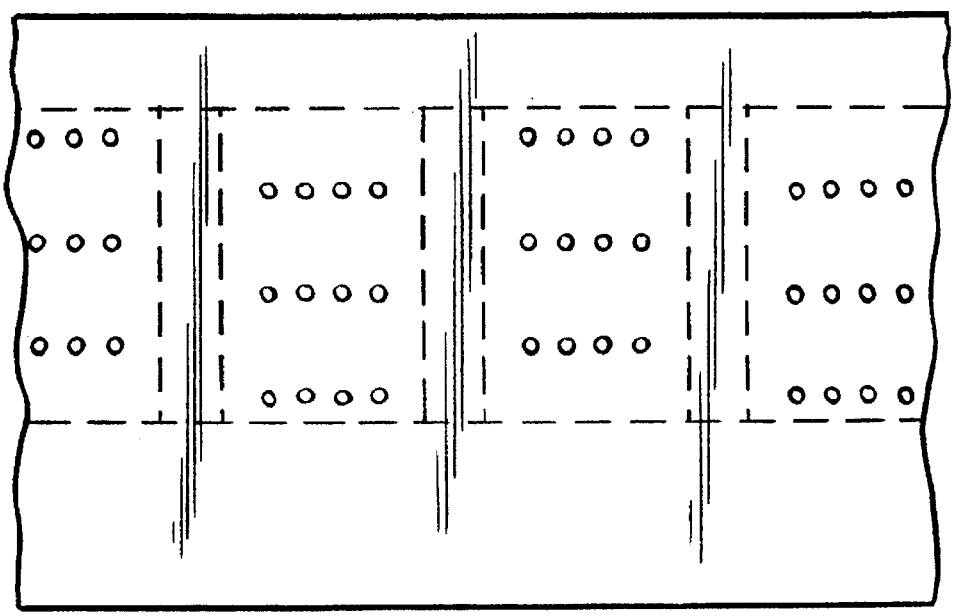
FIG. 4 is a schematic view, in elevation, of the peripheral wall of the distributor.

Distributor peripheral wall 64 includes a series of orifices 90 which, as shown, are preferably arranged in a series of vertical rows communicating with the interiors of compartments 88. Also as shown in FIG. 4, more than a single row of orifices 90 may be used per compartment. FIGS. 3 and 4 also illustrate that the orifices 90 associated with one compartment 88 are vertically offset from orifices in adjacent compartments. Thus, when distributor 60 is rotated, molten A and B glasses will be centrifuged radially outwardly from the orifices 90 and form alternating thin layers of A and B glass. It will be appreciated that the size and spacing of the orifices 90 will dictate the thickness of the individual layers. Typically, orifices 90 will have a diameter of from between about 0.010 to about 0.040 inches (0.25 to about 1.0 mm). The relative sizes of the orifices may differ to produce different flow rates of A and B glasses. This in turn will affect the percentages of A and B glasses in the dual component fibers. Additionally, the sizes of the orifices may affect the build-up or head of glasses in the compartments. Preferably, the orifices in the spinner are sized so that there is little or no build-up of molten materials on the inner face of the spinner peripheral wall. Again, depending upon the relative viscosities of the A and B glasses, orifice size may affect the relative ratios of A and B glasses in the dual component fibers.

While multiple compartments 88 have been illustrated, it will be appreciated that as few as two compartments each on either side of horizontal flange 82 (i.e., one A and one B glass compartment each above and below flange 82) will suffice to distribute the A and B glasses into the alternating thin layers. However, to insure good distribution of the glasses into the alternating thin layers, it is desirable to include multiple compartments spaced around the periphery of distributor 60.

As shown, orifices 90 are circular in cross-section. However, other shapes may be utilized including elongated slots and V- and Y-shaped holes. However, one of the advantages of the present invention is that simple circular holes may be drilled and used. The orifices may be drilled into the distributor wall by any of several known drilling techniques such as mechanical drilling, laser drilling, electrical discharge milling (EDM), or electron beam drilling.

Figure 5:
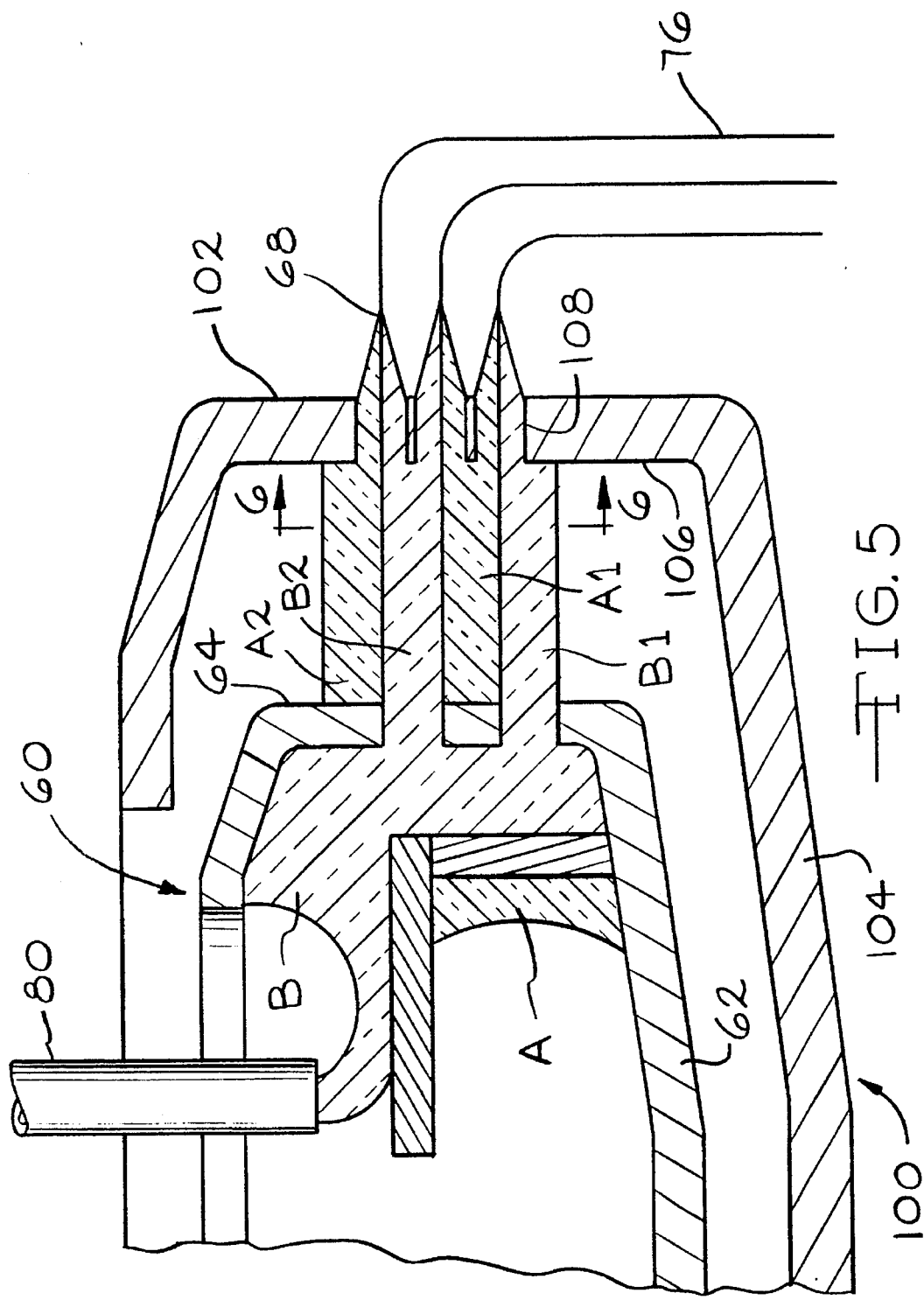
FIG. 5 is a schematic view, in cross-section, showing the flow of the molten thermoplastic materials through the orifices in the distributor forming alternating thin layers of molten thermoplastic material which then pass through the orifices in the spinner to form dual component fibers.

Referring back to FIG. 2, the rotary fiberizer also includes a rotary spinner 100 having a peripheral wall 102 and a bottom wall 104. Spinner 100 is rotated on a spindle 106 by a suitable drive mechanism (not shown). As illustrated, spindle 106 may be contained within hollow spindle 66 to provide for independent rotation of the distributor 60 and spinner 100. As best shown schematically in FIG. 5 (where relative dimensions have been altered for purposes of illustration), the thin, alternating layers of A glass, A1 and A2, and B glass, B1 and B2, centrifuged from Distributor 60 impinge on the inner face 106 of peripheral wall 102. It will be appreciated that while only four alternating layers have been illustrated, for simplicity and ease of understanding, that many more alternating layers may be formed, depending upon the overall height of the spinner and distributor, and the size of the orifices in each. Further, as the topmost and bottommost layers of molten glass feed only one-half the number of orifices as the other layers, the mass flow rate of glass in those layers should be one-half that of the mass flow rate of the other layers. This may be controlled by the proper sizing and spacing of orifices in the distributor 60.

Upon reaching the inner face 106, the alternating layers are centrifuged through orifices 108 (see FIG. 6) to form primary fibers 68. The primary fibers 68 are maintained in a soft, attenuable condition by the heat of annular burner 70 (see FIG. 1). An internal burner (not shown) may also be used to provide heat to the interior of distributor 60 and spinner 100. Annular blower 72, using induced air through passage 74, is positioned to pull primary fibers 68 and further attenuate them into secondary dual-glass fibers 76, suitable for use in wool insulating materials. The dual-glass irregularly-shaped glass fibers are then collected on a conveyor (as shown in FIG. 1) for formation into a wool pack.

Figure 6:
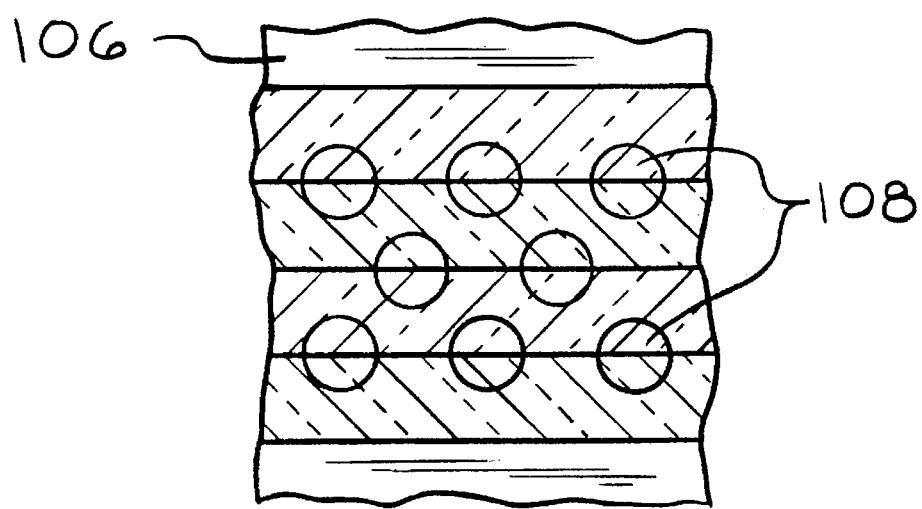
FIG. 6 is a schematic view, in elevation, taken along line 6—6 in FIG. 5.

As illustrated in FIG. 6, orifices 108 in peripheral wall 102 of spinner 100 are positioned so that the alternating layers of molten glass are centered over those orifices. Thus, viewing each orifice axially, one of the molten glasses occupies the upper half of the orifice, while the other molten glass occupies the lower half. It will be appreciated that the orifices may also be positioned to provide a mix of different fibers having varying percentages of A and B glasses.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

I claim:

1. Apparatus for making dual component fibers comprising:

a distributor having a distributor peripheral wall with an interior surface and an exterior surface and a distributor bottom wall, and further including orifices in said peripheral wall, said distributor being divided into a series of compartments by baffles positioned interiorly of said distributor peripheral wall with said orifices communicating with said compartments;

equipment for supplying first and second molten thermoplastic materials to said distributor;

said distributor including a divider for directing said first molten thermoplastic material into alternate ones of said compartments and for directing said second molten thermoplastic material into the remaining ones of said compartments;

a spinner having a spinner peripheral wall and a spinner bottom wall, and further including orifices in said spinner peripheral wall, said distributor being nested within said spinner;

means for rotating said distributor to centrifuge said first thermoplastic material and said second thermoplastic material through said orifices in said peripheral wall of said distributor and against the inner face of said peripheral wall of said spinner; and means for rotating said spinner to centrifuge dual component fibers through said orifices in said peripheral wall of said spinner.

2. An apparatus as claimed in claim 1 in which said orifices in said peripheral wall of said distributor are generally vertically aligned in rows.

3. An apparatus as claimed in claim 2 in which alternating rows of said orifices in said peripheral wall of said distributor communicate with alternating ones of said compartments.

4. An apparatus as claimed in claim 3 in which said divider includes a generally horizontal flange positioned intermediate said distributor peripheral wall and a series of vertical interior wall segments.

5. An apparatus as claimed in claim 1 in which said orifices in said distributor peripheral wall are sized to provide a build-up of molten thermoplastic materials in said compartments.

6. An apparatus as claimed in claim 1 in which said orifices in said spinner are sized so that there is little or no build-up of molten thermoplastic materials on the inner face of said peripheral wall of said spinner.

7. Apparatus for making dual glass fibers comprising:

a distributor having a distributor peripheral wall with an interior, surface and an exterior surface and a distributor bottom wall, and further including orifices in said peripheral wall, said distributor being divided into a series of compartments by baffles located interiorly of said distributor peripheral wall with said orifices communicating with said compartments;

equipment for supplying first and second molten glasses to said distributor;

said distributor including a divider for directing said first molten glass into alternate ones of said compartments and for directing said second molten glass into the remaining ones of said compartments;

a spinner having a spinner peripheral wall and a spinner bottom wall, and further including orifices in said spinner peripheral wall, said distributor being nested within said spinner;

means for rotating said distributor to centrifuge said first molten glass and said second molten glass through said orifices in said peripheral wall of said distributor and against the inner face of said peripheral wall of said spinner; and means for rotating said spinner to centrifuge dual glass fibers through said orifices in said peripheral wall of said spinner.

8. An apparatus as claimed in claim 7 in which said orifices in said peripheral wall of said distributor are generally vertically aligned in rows.

9. An apparatus as claimed in claim 8 in which alternating rows of said orifices in said peripheral wall of said distributor communicate with alternating ones of said compartments.

10. An apparatus as claimed in claim 9 in which said divider includes a generally horizontal flange positioned intermediate said distributor peripheral wall and a series of vertical interior wall segments.

11. An apparatus as claimed in claim 7 in which said orifices in said distributor peripheral wall are sized to provide a build-up of molten glasses in said compartments.

12. An apparatus as claimed in claim 7 in which said orifices in said spinner are sized so that there is little or no build-up of molten glasses on the inner face of said peripheral wall of said spinner.

13. Apparatus for making dual component fibers comprising:

a distributor having a distributor peripheral wall with an interior surface and an exterior surface and a distributor bottom wall, and further including orifices in said peripheral wall, said distributor being divided into a series of compartments by baffles positioned interiorly of said distributor peripheral wall with said orifices communicating with said compartments;

equipment for supplying first and second molten thermoplastic materials to said distributor;

said distributor including a divider for directing said first molten thermoplastic material into alternate ones of said compartments and for directing said second molten thermoplastic material into the remaining ones of said compartments;

a spinner having a spinner peripheral wall and a spinner bottom wall, and further including orifices in said spinner peripheral wall, said distributor being nested within said spinner; and rotating apparatus for rotating said distributor and said spinner such that said first thermoplastic material and said second thermoplastic material are centrifuged through said orifices in said peripheral wall of said distributor and against the inner face of said peripheral wall of said spinner and dual component fibers are centrifuged through said orifices in said peripheral wall of said spinner.

14. An apparatus as claimed in claim 13 in which said divider includes a generally horizontal flange positioned intermediate said distributor peripheral wall and a series of vertical interior wall segments.

* * * * *